United States Patent
Braghiroli

(10) Patent No.: US 9,915,588 B2
(45) Date of Patent: Mar. 13, 2018

(54) METHOD FOR DETECTING THE ECCENTRICITY OF A TIRE FOR VEHICLE WHEELS WITHIN PROCESSES OF MAINTENANCE OF SAID WHEELS AND APPARATUS FOR THE MAINTENANCE OF WHEELS OF VEHICLES

(71) Applicant: SNAP-ON EQUIPMENT S.R.L. A UNICO SOCIO, Correggio (IT)

(72) Inventor: Francesco Braghiroli, Reggio Emilia (IT)

(73) Assignee: SNAP-ON EQUIPMENT S.R.L. A UNICO SOCIO, Correggio (RE) (IT)

( * ) Notice: Subject to any disclaimer, the term of this patent is extended or adjusted under 35 U.S.C. 154(b) by 58 days.

(21) Appl. No.: 15/045,703

(22) Filed: Feb. 17, 2016

(65) Prior Publication Data

US 2016/0245725 A1 Aug. 25, 2016

(30) Foreign Application Priority Data

Feb. 20, 2015 (IT) .............................. MI2015A0247

(51) Int. Cl.
*G01M 17/02* (2006.01)
*G01B 11/02* (2006.01)
*G01B 11/24* (2006.01)

(52) U.S. Cl.
CPC ......... *G01M 17/027* (2013.01); *G01B 11/026* (2013.01); *G01B 11/2408* (2013.01)

(58) Field of Classification Search
None
See application file for complete search history.

(56) References Cited

U.S. PATENT DOCUMENTS

| 5,485,406 A * | 1/1996 | Wada ..................... G01B 11/22 33/551 |
| 7,466,430 B2 * | 12/2008 | Braghiroli ............... G01M 1/02 356/601 |

(Continued)

FOREIGN PATENT DOCUMENTS

| EP | 1947419 A1 | 7/2008 |
| EP | 2020594 A1 | 2/2009 |

(Continued)

OTHER PUBLICATIONS

Italian Search Report dated Oct. 27, 2015, issued in corresponding Italian Application No. ITMI20150247.

*Primary Examiner* — Andre Allen
(74) *Attorney, Agent, or Firm* — McDermott Will & Emery LLP

(57) ABSTRACT

An apparatus for the maintenance of wheels of vehicles, like a balancer or a device for mounting/dismounting tires, comprises a support adapted to support a rim of a wheel of a vehicle. A device for detecting the eccentricity of a tire of the wheel is mounted on the support. Such device comprises an optical system configured to capture a light beam reflected by a tread of the tire and focus it on a point of an optical sensor. The optical sensor emits a signal indicative of an average value of a radial distance of the linear portion from the main axis. A control unit processes a plurality of average values corresponding to different linear portions of the tread and obtained during the rotation of the tire, and detects the eccentricity of said tire.

13 Claims, 3 Drawing Sheets

(56) References Cited

U.S. PATENT DOCUMENTS

| | | |
|---|---|---|
| 2005/0052657 A1 | 3/2005 | Braghiroli |
| 2005/0268707 A1 | 12/2005 | Dale et al. |
| 2009/0033949 A1 | 2/2009 | Braghiroli |
| 2011/0208476 A1* | 8/2011 | Braghiroli .............. G01B 17/06 702/155 |
| 2014/0157895 A1* | 6/2014 | Braghiroli ............. G01M 1/225 73/462 |
| 2015/0168267 A1 | 6/2015 | Takahashi et al. |
| 2016/0231203 A1* | 8/2016 | Braghiroli ........... G01M 17/027 |
| 2016/0245725 A1* | 8/2016 | Braghiroli ............ G01B 11/026 |

FOREIGN PATENT DOCUMENTS

| | | | | |
|---|---|---|---|---|
| JP | WO 2015133027 A1 * | 9/2015 | .......... | G01M 17/027 |
| WO | 2014038444 A1 | 3/2014 | | |

* cited by examiner

METHOD FOR DETECTING THE ECCENTRICITY OF A TIRE FOR VEHICLE WHEELS WITHIN PROCESSES OF MAINTENANCE OF SAID WHEELS AND APPARATUS FOR THE MAINTENANCE OF WHEELS OF VEHICLES

CROSS-REFERENCE TO RELATED APPLICATION

This application claims the priority and benefit of Italian Patent Application No. MI2015A000247, filed on Feb. 20, 2015 with the Italian Patent and Trademark Office, the disclosure of which is incorporated herein by reference in its entirety.

TECHNICAL FIELD

The object of the present disclosure is to provide a method and a device for detecting the eccentricity of tires for vehicle wheels, preferably within operations of maintenance of the wheels executed on apparatuses for the maintenance of wheels of vehicles. In particular, the present disclosure is preferably in the scope of the apparatuses used by the tire specialists in the repair shops, such as tire changer and balancing machines. More generally, the present disclosure has application each time a tire mounted on a respective rim needs to be managed (verified, controlled, substituted). Another object of the present disclosure is an apparatus for the maintenance of wheels of vehicles integrating such device and configured to execute the method disclosed herein.

BACKGROUND

The document US 2005/0052657 illustrates a method and an apparatus for executing the scanning of a tire for vehicle wheels mounted on a balancing machine. A light source emits a laser light beam on the surface of the tire. Such beam is reflected by the surface and captured by a CCD receiver. The receiver generates position signals based on the point of impact of the reflected beam and transmits them to a computer. The light source and the receiver are mounted on a support which can rotate around a respective pin and/or translate, moved by a suitable motor. The light source emits the light beam which defines a point of light on the tire. The light beam is reflected, passes through a focusing optical system up to a sensitive element of a CCD sensor, both part of the CCD receiver. The reflected light beam, directed by the optical system, impacts a specific zone of the CCD sensor, a function of the distance. The above-described apparatus allows scanning the entire surface of the tire due to the possibility for the support (with emitter and receiver) to be moved in rotation around the respective pin and/or in translation and allows acquiring an entire series of data of said tire (eccentricity, wear, conicity, etc.).

The Applicant has observed that such apparatus is mechanically complex and costly, in particular due to the presence of motors and structures such as to allow the movement of the light source and of the CCD receiver alongside the tire (by means of the rotation around the pin and/or the translation). In addition, the Applicant has observed that, in the absence of such movements of the support, the apparatus described in US 2005/0052657 could not perform its own function, i.e. executing the scanning of the entire surface, given that the light beam is point-like.

The document EP 2 020 594, on behalf of the same Applicant, illustrates a method and an apparatus for determining the geometric size of a tire for vehicle wheels mounted on a balancing machine or on a tire changer. The apparatus comprises a light source capable of generating a planar light beam which comes to impact a strip of the surface of the tire. At each point of said strip, defined by the intersection of the planar beam of light with the tire, the light beam is reflected and decomposed. The reflected beam is captured by a receiver provided with a sensitive two-dimensional surface, of CCD or CMOS type. Such sensitive surface generates signals proportional to the position of each point, of the strip, reflected on said sensitive surface.

The Applicant recognizes that the solution described in EP 2 020 594 allows the simultaneous acquisition of a plurality of points belonging to said strip, maintaining the light source and the receiver fixed with respect to a rotation axis of the tire; however, the cost of such instrumentation, in particular of the sensor with sensitive two-dimensional surface and relative electronics, is very high and has a significant effect on the cost of the entire machine (balancing machine or tire changer).

OBJECT OF THE DISCLOSURE

In such scope, the Applicant has set the objective of proposing a method and a device that are simple and reliable for detecting the eccentricity of a tire for vehicle wheels, preferably before, after and during the maintenance of a wheel. In particular, an object of the disclosure is to propose a method that is simple and reliable and a device that is compact and relatively inexpensive.

The Applicant has also set the object of proposing an apparatus for the maintenance of wheels of vehicles, employed in the maintenance and/or preparation repair shops for the vehicles themselves, integrating a device adapted to detect the eccentricity of a tire of the wheel. A particular object of the disclosure is to propose an apparatus for managing wheels of vehicles that is structurally simple, relatively inexpensive, easy to use and to maintain.

SUMMARY

The Applicant has found that such objectives and objects can be obtained by detecting the position of the tread of the tire by means of a light beam of planar type, which is reflected and captured. Such light beam only illuminates a limited linear portion of the tread and, after having been reflected, is focused on a single point of an optical sensor. Such beam, focused and captured by optical sensor, determines the generation of a signal indicative of an average value of the distance of the linear portion by the emitting/receiving device, said average value being calculated along the extension of said linear portion. In other words, the intersection between the planar light beam and the surface of the tread identifies a light line corresponding to said linear portion. Such linear portion is extended transversely with respect to the circumferential extension of the tread and preferably but not necessarily parallel to the axis of the tire, and is narrower than the width of the tread. Along the extension of the linear portion, the tread can have different radial dimensions, in particular due to the presence of grooves which delimit blocks of the tread itself. The light beam of planar type, after its reflection on the tread, generally does not maintain its planarity due to the irregularities of the surface. The reflected irregular beam is captured and focused on a single point of the sensor. The position of such point on the sensor is a function of the average distance, with respect to the emitting/receiving device, i.e. of the average radial distance (with reference to the rim and tire assembly), of the points belonging to the linear portion of the tread from the main axis. The sensor therefore generates a signal that is indicative of said average radial distance of the points belonging to the linear portion of the tread.

By signal indicative of the average radial distance, it is intended to reference a signal correlated to said average radial distance, e.g. proportional or inversely proportional thereto. Such signal can be correlated to the relative position (and hence to the linear distance, angular distance, etc.) of the linear portion with respect to at least one reference point not necessarily placed on the main axis but whose position with respect to said main axis is known. Such at least one reference point is preferably fixed with respect to the main axis. Such at least one reference point can also be movable with known motion law, in a manner such that at each instant, its position with respect to said main axis is still known. Such signal is, for example, a function of the distance of the linear portion from one or more elements of the emitting/receiving device (e.g. from the source and/or from the optical sensor and/or from the optical focusing system) which are fixed and lie in known positions with respect to the main axis.

Such average radial distance is affected by the possible irregularities and/or grooves but above all also by the radial position of the surface of the tread outside the grooves which is in direct contact with the ground during the rolling of the tire mounted on a vehicle. By processing all the signals coming from the sensor during the revolution of the tire, it is possible to detect the eccentricity of such tire. The present disclosure therefore allows detecting/evaluating the greatest eccentricity (that which most affects the performances and the comfort of a tire), i.e. that of the contact surface of the tire with the ground.

More specifically, in accordance with a first aspect, the present disclosure relates to a method for detecting the eccentricity of a tire for vehicle wheels, preferably within processes of maintenance of said wheels, comprising:

i. making a wheel rotate around a main axis of said wheel, said wheel comprising a rim and a tire;
ii. illuminating a linear portion of a tread of the tire with a planar beam of light, preferably laser, wherein said linear portion has an axial width smaller than an axial width of the tread and greater than an axial width of grooves of said tread;
iii. capturing a light beam reflected by the tread and focusing it on a point of an optical sensor, in which a signal emitted by the optical sensor is indicative of an average value of a radial distance of the linear portion from the main axis, said average value being calculated along the extension of said linear portion;
iv. processing a plurality of average values corresponding to different linear portions of the tread and obtained during the rotation of the tire and detecting the eccentricity of said tire.

In accordance with a second aspect, the present disclosure relates to a device for detecting the eccentricity of a tire for vehicle wheels, preferably implementable on an apparatus for the maintenance of wheels of vehicles, comprising:

a source emitting a planar light beam, preferably laser, configured to illuminate a linear portion of a tread of the tire, wherein said linear portion has an axial width smaller than an axial width of the tread and greater than an axial width of grooves of said tread;

an optical detector comprising an optical focusing system and an optical sensor, wherein the optical focusing system is configured to capture a light beam reflected by the tread and focus it on a point of the optical sensor; wherein the optical sensor is configured to emit a signal indicative of an average value of a radial distance of the linear portion, said average value being calculated along the extension of said linear portion;

a control unit operatively connected to the optical detector and configured to process a plurality of average values corresponding to different linear portions of the tread and obtained during the rotation of the tire and detecting the eccentricity of said tire.

In accordance with a third aspect, the present disclosure relates to an apparatus for the maintenance of wheels of vehicles, comprising:

a base;
a support mounted on the base and adapted to receive and rotatably support a rim of a wheel of a vehicle;
a device for detecting the eccentricity of a tire of the wheel mounted on the support in accordance with the second aspect and/or implementing the method according to the first aspect.

In accordance with a fourth aspect, the present disclosure relates to a process for the maintenance of wheels of vehicles, comprising the method in accordance with the first aspect and/or which exploits the device in accordance with the second aspect.

The Applicant has verified that the disclosure allows detecting, with precision and reliability, the eccentricity of the tire without using complex, bulky and costly systems, so to be able to implement the method and the device in the machines for the maintenance of the wheels of vehicles without excessively increasing bulk and costs of production and maintenance thereof. In particular, the method according to the disclosure allows detecting the eccentricity of the tires possibly simultaneously (during, just before or just after) with the operation of maintenance thereof in a simple reliable and quick manner, ensuring that the data are transmitted to the control unit of the maintenance apparatus or to other computers that are integrated or outside the apparatus itself. The device according to the disclosure allows implementing the detection of the eccentricity by maintaining the structure of the apparatus relatively simple and compact overall.

In one aspect, the apparatus comprises a motor operatively connected to the support and configured to make said rotatable support and the wheel rotate around the main axis of said wheel.

In one aspect, the control unit is also configured to drive the motor such that it rotates the rotatable support and the wheel.

In one aspect, the apparatus is a device for mounting tires on a rim and/or dismounting tires from a rim (tire changer).

In one aspect, the apparatus is a balancer.

In one aspect, the process comprises: balancing the wheel.

In one aspect, the process comprises: mounting a tire on a rim and/or dismounting a tire from a rim.

In one aspect, the emitting source is mounted fixed on the base. In one aspect, the optical detector is mounted fixed on the base. In one aspect, the apparatus comprises a support structure constrained to the base, preferably in a removable manner, and bearing the emitting source and the optical detector suitably spaced from each other. In one aspect, the position of the emitting source and of the optical detector can possibly be adjusted but at least during the steps ii. and iii of the method, the planar beam of light (and hence the emitting source) and the optical sensor are fixed with respect to the main axis, i.e. on the base.

In one aspect, the emitting source is positioned at a distance from the tread comprised between about 100 mm and about 500 mm. Such distance depends on the size of the tire. In one aspect, the emitting source is configured to emit a planar light beam that has an opening angle of about 3°. The emitting source projects the linear portion (light line) on the tread. In one aspect, the linear portion is placed at or close to a center plane of the tire. In one aspect, the axial width of the linear portion is comprised between about 2% and about 10% of the axial width of the tread. In one aspect, the axial width of the linear portion is comprised between about 3 mm and about 30 mm, preferably comprised between about 5 mm and about 25 mm. Such values allow illuminating and capturing at least one zone of the contact surface of the tread with the ground, without the risk that the entire linear portion will fall within a groove.

In one aspect, the optical sensor is of linear type (image sensor line). In one aspect the optical sensor is of CCD (charge-coupled device) type. In one aspect, the CCD optical sensor is constituted by a linear matrix of photodiodes/pixels. In one aspect, the linear matrix is composed of 2048×1 pixels. Such sensor type, of per se known type, is simple, inexpensive and does not require complex electronics for processing the signals.

In one aspect, the optical focusing system comprises at least one lens, preferably spherical. The reflected light beam encounters the optical focusing system in different zones of said optical focusing system and is focused in different points of the optical sensor.

The reflected light beam is focused by the optical focusing system on the linear sensor and captured by one of the pixels. The position on the linear sensor of the pixel receiving/excited by the focused light beam is a function of the distance of the linear portion from the "light source/optical focusing system/optical sensor" assembly. Since the distance of such system from the main rotation axis is known, it is possible to obtain the (average) radius/diameter of the tread at the single linear portion and calculate, in a per se known manner and during the rotation of the tire, the overall eccentricity of such tread. It is also possible to obtain the eccentricity without directly calculating the average radii/diameters. It is in fact sufficient to take any one reading of the optical sensor as reference value and place it equal to zero. After this, all the subsequent readings (obtained with the rotation of the wheel) will provide values that, in case of eccentricity, diverge positively or negatively from the "zero value".

In one aspect, the control unit comprises software configured to execute such operations.

BRIEF DESCRIPTION OF THE DRAWINGS

Further characteristics and advantages will be clearer from the detailed description of preferred but not exclusive embodiments of an apparatus for the maintenance of wheels of vehicles in accordance with the present disclosure.

Such description will be set forth hereinbelow with reference to the enclosed drawings, provided only as a non-limiting example, in which.

DETAILED DESCRIPTION

With reference to the enclosed figures, reference number 1 overall indicates an apparatus for the maintenance of wheels of vehicles.

Figure 1:
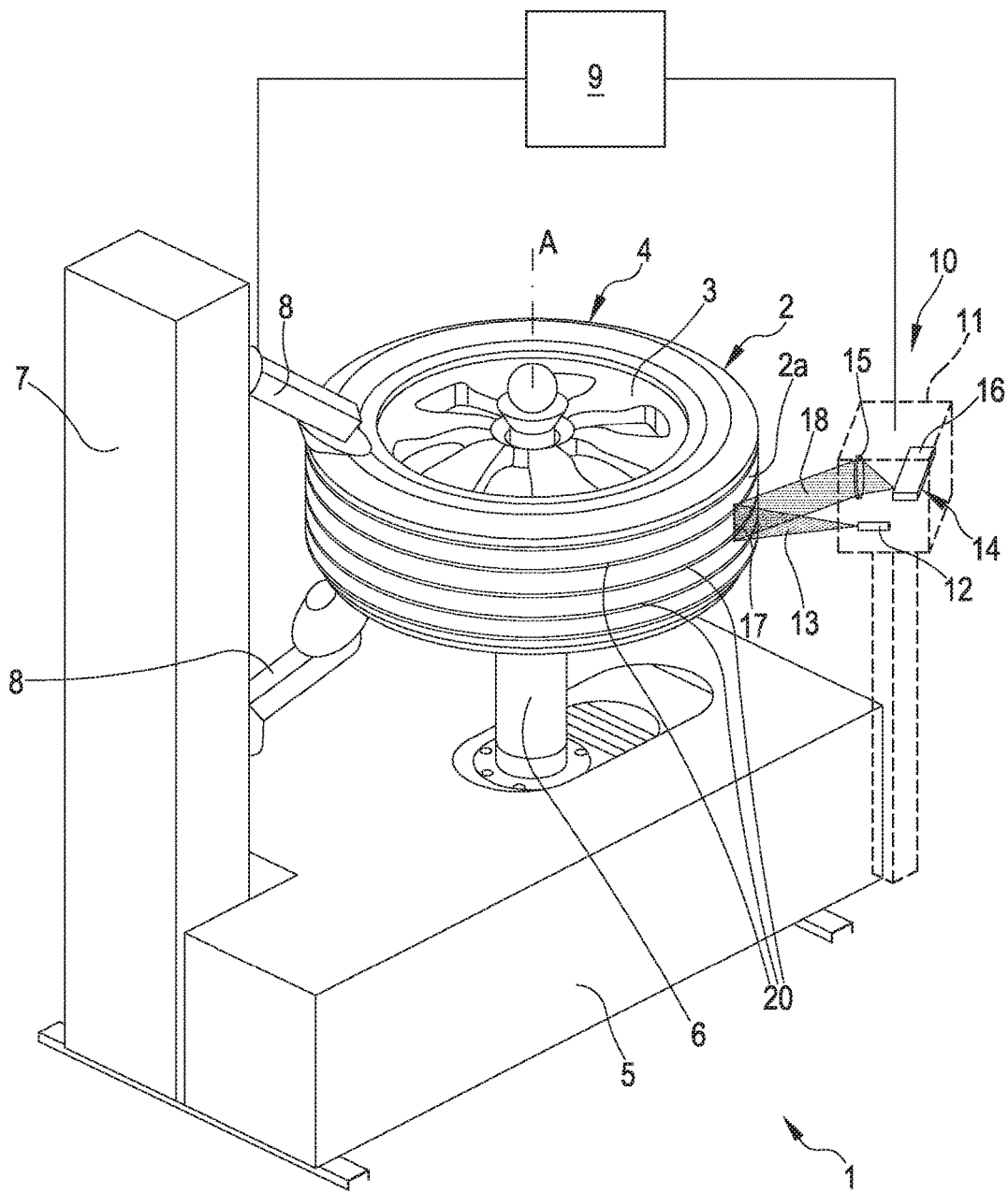
FIG. 1 shows a first embodiment of the apparatus according to the disclosure.

The apparatus 1 illustrated in FIG. 1 is a device for mounting tires 2 on a rim 3 of a wheel 4 and/or dismounting tires 2 from a rim 3. The apparatus 1 comprises a base 5 intended to be abutted against the ground. A rotatable support 6 is mounted on the base 5, such support defined by a vertical shaft which has support means arranged at its upper end, not illustrated in detail and per se known, such as a support plate intended to receive and support the rim 3 of the wheel 2; the vertical shaft also has locking means, not illustrated in detail and per se known, which allow integrally constraining the rim 3 to the shaft 6. The shaft 6 is rotatable on the base 5 around a main axis "A" thereof and is connected to an electric motor, for example inside a casing of the base 5 and not illustrated. The motor is configured to make the shaft 6 and the wheel 4 rotate together around the main axis "A" of the shaft 6 (which coincides with the main axis or rotation axis of the wheel 4). The base 5 comprises a column 7 which is vertically extended. The column 7 is substantially parallel to the shaft 6 and bears an assembly and disassembly tool 8, per se known and not described in detail, adapted to dismount and mount a tire 2 from the/onto the rim 3. The assembly and disassembly tool 8 is configured to come into contact with the sidewalls of the tire 2 from below and from above, in proximity to the beads of the tire 2 which, when said tire 2 is mounted on the rim 3, lie behind two beads belonging to the rim 3 itself.

An actuator, per se known and not illustrated, is operatively connected to the assembly and disassembly tool 8 and is connected to a control unit 9 of the apparatus 1. The control unit 9 is configured to send control signals to the actuator so as to command the assembly and disassembly tool 8 in order to dismount or mount a tire 2 from the/onto the rim 3. Such operation is managed by an operator by means of a user interface (comprising, for example, buttons, pedals, touch screen, etc.) connected to the control unit and not illustrated.

The apparatus 1 comprises a device 10 for detecting the eccentricity of a tire 2 for vehicle wheels. The device 10 comprises a support structure 11, for example defined by a box-like body, mounted fixed on the base 5 and placed alongside the support 6 and the wheel 4 mounted on the support 6. As is visible in FIG. 1, the box-like body 11 lies side-by-side and spaced from a tread 2A of the tire 2. The box-like body 11 can be mountable on the base 5 and removable in block from the base 5. In an alternative, non-illustrated embodiment, the position of the box-like body 11 can be adjusted (moved and once again fixed on the base 5), for example based on the size of the tire 2.

The box-like body 11 bears a source 12 emitting a planar light beam 13. Such source 12 is for example a laser provided with a cylindrical lens, not illustrated, adapted to transform the beam emitted by the laser in the planar light beam 13. As is visible in FIGS. 1 and 3, the planar light beam 13 lies in one plane and diverges, moving away from the source 12. The planar light beam 13 has for example an opening angle "Ω" of about 3°.

The box-like body 11 bears an optical detector 14 comprising an optical focusing system 15 and an optical sensor 16 of linear type. The optical sensor 16 is of CCD type, formed by an array of pixels (e.g. 2048×1). The optical focusing system 15 comprises a single spherical lens in the illustrated embodiments.

Figure 3:
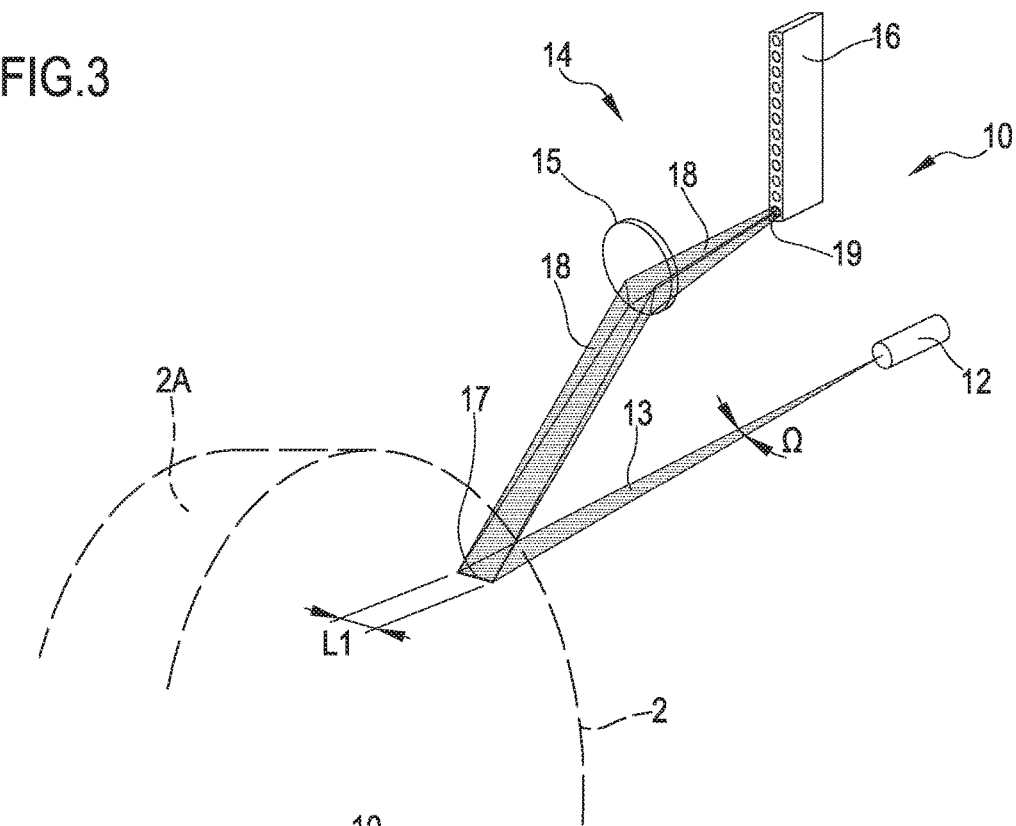
FIG. 3 is a three-dimensional schematic view of elements of the device according to the disclosure.
Figure 4:
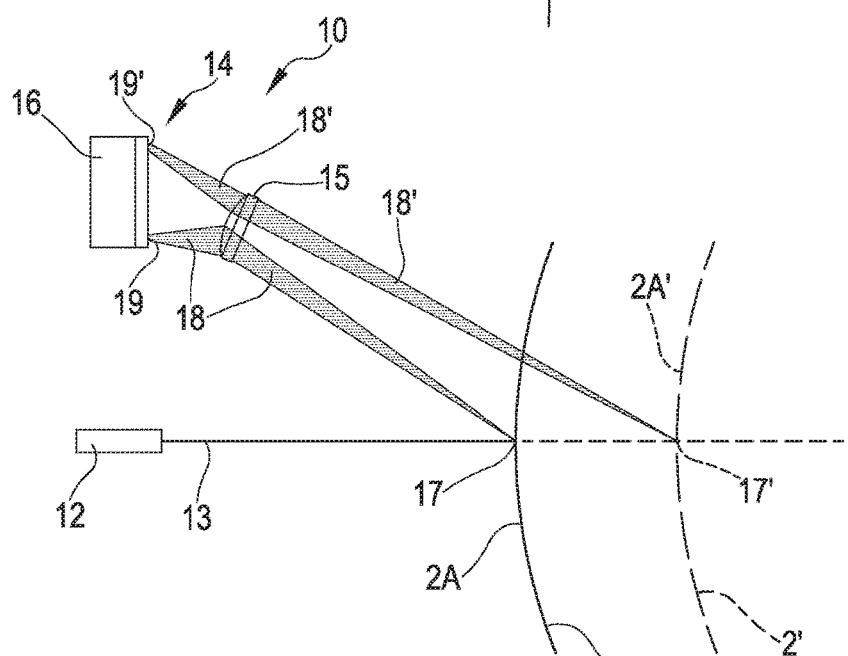
FIG. 4 is a side view of the device of FIG. 3.

As is more visible in FIGS. 3 and 4, the source 12 is directed towards the support 6. When the tire 2 is on the support 6, the source 12 is directed towards the tread 2A of said tire 2. The optical sensor 16 is side-by-side the source 12, spaced therefrom and also directed towards the tire 2. The spherical lens 15 is placed across from the optical sensor 16 with a convex face directed towards the optical sensor 16 and an opposite face planar. The relative position between the source 12, the spherical lens 15 and the optical sensor 16 is such that the planar light beam 13 reflected by the tire 2 encounters the spherical lens 15 and is focused at a point of the optical sensor 16.

More in detail, the planar light beam 13 preferably lies, even if not necessarily, in a plane parallel to the main rotation axis "A" of the wheel 4, and by hitting the tread 2A generates an illuminated linear portion 17 thereon substantially defined by a line parallel to said main axis "A" (FIGS. 1 and 3). Such linear portion 17 is preferably situated at a center plane "M" of the tire 2, i.e. at the radially outer portion of the tire 2 intended to roll in contact with the ground.

As is visible in FIG. 1, the linear portion 17 partly lies on a radially outer surface of the tread 2A and partly in a groove 20 of the same tread 2A.

The axial width "L1" of the linear portion 17 is such to be greater than the width "L2" of the groove 20 of the tread 2A, in order to be certain that the light beam hits and is at least partly reflected by the radially outer surface of the tread 2A. The width "L1" of the linear portion 17 is in any case much less than the overall width "L3" of the tread 2A (measured parallel to the main axis "A"). Such width "L1" of the linear portion 17 depends on the distance between the source 12 and the tread, i.e. on the size of the tire 2. For example, if the source 12 is placed at a distance of about 100 mm, the width "L1" of the linear portion 17 is about 5 mm. If the source 12 is placed at a distance of about 500 mm, the width "L1" of the linear portion 17 is about 25 mm. If a tread 2A is considered with a width "L3" of about 250 mm, the axial width "L1" of the linear portion 17 is comprised between about 2% and about 10% of the axial width of the tread 2A.

The laser light, reflected by the tread 2A, generates a reflected light beam 18 that is generally not planar. The spherical lens 15 intercepts the reflected light beam 18 and focuses it in a point 19 of the optical sensor 16. As is visible in FIGS. 1, 3 and 4, after having crossed the spherical lens 15, the reflected light beam 18 converges in a single point 19 on the optical sensor 16. The point at which the reflected light beam 18 converges depends on the distance the linear portion 17 of the tread 2A is situated from the system formed by the source 12 and by the optical detector 14.

Such point 19 in reality has its own area, even if minimal, which for example corresponds to one of the pixels of the optical sensor 16 and is for example comprised between about $1 \times 10^{-4}$ mm$^2$ and about $3 \times 10^{-4}$ mm$^2$.

Illustrated in FIG. 4 is the path of the laser light with a tire 2 of larger size and with a smaller tire 2'. As can be observed, the light beam 18 reflected by the larger tire 2 is focused on a lower point of the optical sensor 16 (lower with reference to FIG. 4) while the light beam 18' reflected by the smaller tire 2' is focused on a higher point of the optical sensor 16 (still with reference to FIG. 4).

The optical sensor 16 is operatively connected to the control unit 9 of the apparatus 1, which contains software configured to process the signals coming from the sensor 16 itself.

In accordance with the process and the method according to the disclosure, the wheel 4 complete with rim 3 and tire 2 is mounted on the support 6. Before proceeding with the disassembly of the tire 2 from the rim 3 or after having mounted the tire 2 on the rim 3, by means of the assembly and disassembly tool 8 and in a per se known manner, the wheel 4 is rotated, e.g. with an angular speed comprised between about 2 rpm and about 25 rpm.

The device 10, which is fixed on the base 5, is activated. The source 12 illuminates the linear portion 17 of the tread 2A with the planar beam of light 13. As a function of the distance of such linear portion 17 from the system constituted by the source 12 and by the optical detector 14, i.e. as a function of the radial distance of the tread 2A at said linear portion 17, the reflected light beam 18 encounters the spherical lens 15 at different zones of said lens 15 (different for position and shape) and is focused at different points of the optical sensor 16. The incidence point 19 is therefore indicative of the radius/diameter of the tread 2A.

As mentioned above, since such linear portion 17 can be partly situated on a radially outer surface of the tread 2A (crest of a block of the tire 2) and partly in a groove 20, the zone of incidence of the lens 15 and consequently the point of incidence 19 on the optical sensor 16 are indicative of an average of the radial distance at which the points which form the linear portion 17 are situated with respect to the main axis (or of an average of the distance at which said points of the linear portion 17 are situated with respect to the system constituted by the source 12 and by the optical detector 14). The optical sensor 16 therefore emits a signal indicative of the average radius/diameter (or of the average distance from the optical detector) and sends it to the control unit 9.

During the rotation of the wheel 4, the control unit 9 receives a sequence of said signals indicative of the average diameters (or of the average distances) of a circumferential band of the tread 2A defined by the linear portions 17 sequentially and continuously illuminated by the planar light beam 13. The control unit 9 is configured to process, through the software, a plurality of average values corresponding to different linear portions of the tread and to detect the eccentricity of said tire 2. By way of a non-limiting example, in order to obtain the eccentricity, it is possible to take any one reading of the optical sensor 16 (one of said average values) as reference value and place it equal to zero. After this, all the subsequent readings (obtained with the rotation of the wheel 4) will provide values that, in case of eccentricity, positively or negatively diverge from the "zero value".

Once the eccentricity of the tire 2 is known, if the eccentricity of the rim 3 is also known (such eccentricity obtained with different and further devices of per se known type and not described herein), it is possible to dismount the tire 2 from the rim 3 and then mount it again in a different angular position such that the respective eccentricities will at least partially and as much as possible come to compensate each other (technique known as "match mounting").

Figure 2:
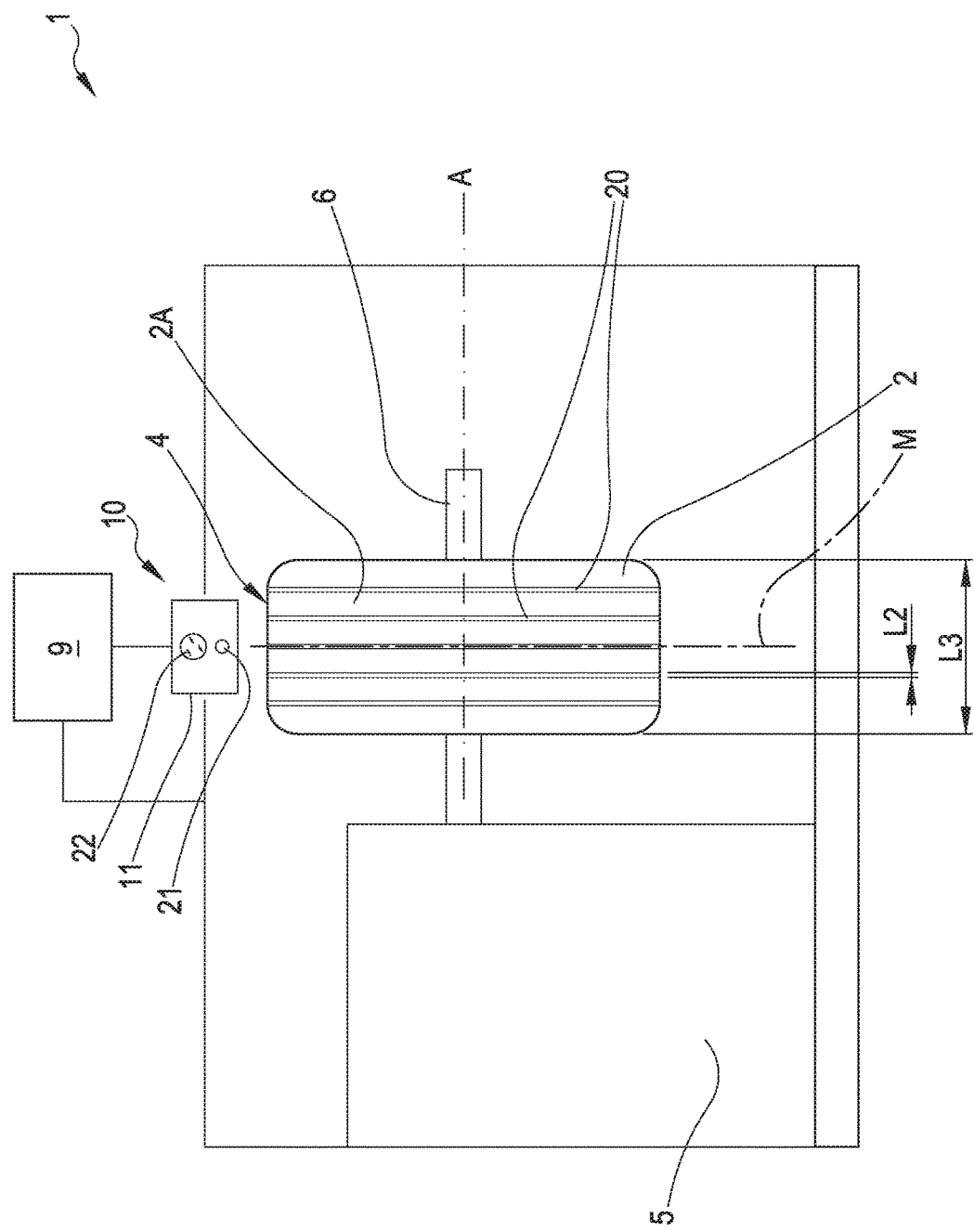
FIG. 2 shows a second embodiment of the apparatus according to the disclosure.

In a different embodiment, the apparatus 1 is a balancer of wheels 4 (illustrated in FIG. 2). For the elements of the balancer 1 corresponding to those present in the device for mounting/dismounting tires 2, the same reference numbers were used. The balancer 1 comprises a base 5 intended to be abutted against the ground. A rotatable support 6 is mounted on the base 5, such support 6 defined by a horizontal shaft which has support means arranged at its ends, not illustrated in detail and per se known, such support means being intended to receive and support the rim 3 of the wheel 2. The horizontal shaft also has locking means, not illustrated in detail and per se known, which allow integrally constraining the rim 3 to the shaft 6. The shaft 6 is rotatable on the base 5 around its main axis "A" and is connected to an electric motor, for example inside a casing of the base 5 and not illustrated. The motor is configured to make the shaft 6 and the wheel 4 rotate together around the main axis "A" of the shaft 6 (which coincides with the main axis or rotation axis of the wheel 4). The balancer 1 comprises devices, per se known and not described or illustrated, adapted to allow the dynamic balancing of the wheel while this wheel rotates around the main axis "A".

The balancer 1 comprises the device 10 for detecting the eccentricity of a tire 2 mounted on the base 5 and facing the tread 2A. Visible in FIG. 2 is the box-like body 11 within which the source 12 and the optical detector 14 (not visible in FIG. 2) are housed. The box-like body 11 is provided with a first lower opening 21, for the passage of the planar light beam 13 emitted by the source 12 and with a second upper opening 22 adapted to allow the passage of the reflected light beam 18 and the capture thereof by the optical detector 14. The apparatus 1 also comprises a control unit 9 configured to manage the balancing process and also for detecting the eccentricity.

The structure and the operation of the device 1 in accordance with the method of the disclosure is analogous to that described above for the apparatus for mounting/dismounting tires 2 and will not be repeated herein. In this case, the detection of the eccentricity can be executed, during or after the balancing. During the detection of the eccentricity and/or the balancing, the wheel 4 revolves at an angular speed for example comprised between about 60 rpm and about 300 rpm.

The invention claimed is:

1. A method for detecting the eccentricity of a tire for vehicle wheels, preferably within processes of maintenance of said wheels, comprising:
   i. making a wheel rotate about a main axis of said wheel, said wheel comprising a rim and a tire;
   ii. illuminating a linear portion of a tread of the tire with a planar beam of light wherein an intersection between the planar light beam and a surface of the tread identifies a light line corresponding to said linear portion, and wherein said linear portion has an axial width smaller than an axial width of the tread and greater than an axial width of grooves of said tread;
   iii. capturing a light beam reflected by the tread and focusing it on a point of an optical sensor, in which a signal emitted by the optical sensor is indicative of an average value of a radial distance of the linear portion from the main axis, said average value being calculated along the extension of said linear portion; and
   iv. processing a plurality of average values corresponding to different linear portions of the tread and obtained during the rotation of the tire and detecting the eccentricity of said tire.

2. The method according to claim 1, wherein, at least during the steps ii and iii, the planar beam of light and the optical sensor are fixed with respect to the main axis.

3. The method according to claim 1, wherein the linear portion is positioned at or close to a center plane of the tire.

4. The method according to claim 1, wherein the axial width of the linear portion is between about 2% and about 10% of the axial width of the tread.

5. The method according to claim 1, wherein the axial width of the linear portion is between about 3 mm and about 30 mm.

6. The method according to claim 1, wherein the axial width of the linear portion is between about 5 mm and about 25 mm.

7. The method according to claim 1, wherein the planar beam of light is a laser beam.

8. An apparatus for the maintenance of vehicle wheels, comprising:
   a base;
   a support mounted on the base and adapted to receive and rotatably support a rim of a wheel of a vehicle; and
   a device for detecting the eccentricity of a tire of the wheel mounted on the support;
   wherein said device comprises:
      a source emitting a planar light beam and configured to illuminate a linear portion of a tread of the tire, wherein an intersection between the planar light beam and a surface of the tread identifies a light line corresponding to said linear portion, and wherein said linear portion has an axial width smaller than an axial width of the tread and greater than an axial width of grooves of said tread;
      an optical detector comprising an optical focusing system and an optical sensor, in which the optical focusing system is configured to capture a light beam reflected by the tread and to focus it on a point of the optical sensor, in which the optical sensor is configured to emit a signal indicative of an average value of a radial distance of the linear portion with respect to the main axis, said average value being measured along the extension of said linear portion; and
      a control unit operatively connected to the optical detector and configured to process a plurality of average values corresponding to different linear portions of the tread and obtained during the rotation of the tire and to detect the eccentricity of said tire.

9. The apparatus according to claim 8, wherein the optical sensor is of the linear type.

10. The apparatus according to claim 8, wherein the emitting source and the optical detector are mounted fixed on the base.

11. The apparatus according to claim 8, wherein the emitting source is positioned at a distance from the tread between about 100 mm and about 500 mm.

12. The apparatus according to claim 8, wherein said apparatus is a balancing machine or a tire changer.

13. The apparatus according to claim 8, wherein the planar light beam is a laser beam.

* * * * *